(12) United States Patent  (10) Patent No.: US 7,428,660 B2
Yoshida  (45) Date of Patent: Sep. 23, 2008

(54) STARTING CONTROL METHOD, DUPLEX PLATFORM SYSTEM, AND INFORMATION PROCESSOR

(75) Inventor: Masahiro Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 364 days.

(21) Appl. No.: 11/304,565

(22) Filed: Dec. 16, 2005

(65) Prior Publication Data

US 2006/0150002 A1 Jul. 6, 2006

(30) Foreign Application Priority Data

Dec. 20, 2004 (JP) .............................. 2004-367747

(51) Int. Cl.
*G06F 11/00* (2006.01)

(52) U.S. Cl. .............................. 714/12; 714/10; 714/11; 713/2

(58) Field of Classification Search ..................... 714/12
See application file for complete search history.

(56) References Cited

U.S. PATENT DOCUMENTS

| | | | | |
|---|---|---|---|---|
| 5,675,723 | A | * | 10/1997 | Ekrot et al. ..................... 714/4 |
| 5,822,512 | A | * | 10/1998 | Goodrum et al. ............... 714/13 |
| 5,838,894 | A | * | 11/1998 | Horst ........................... 714/11 |
| 6,496,940 | B1 | * | 12/2002 | Horst et al. ..................... 714/4 |
| 2005/0038981 | A1 | * | 2/2005 | Connor et al. .................. 713/1 |
| 2005/0086560 | A1 | * | 4/2005 | Okeda et al. ................... 714/11 |
| 2005/0229035 | A1 | * | 10/2005 | Peleska et al. ................. 714/12 |
| 2006/0150002 | A1 | * | 7/2006 | Yoshida ....................... 714/10 |

FOREIGN PATENT DOCUMENTS

| | | |
|---|---|---|
| JP | 06-131208 | 5/1994 |
| JP | 11-175108 | 7/1999 |
| JP | 11-296398 | 10/1999 |
| JP | 2002-140315 A | 5/2002 |

* cited by examiner

*Primary Examiner*—Emerson C Puente
(74) *Attorney, Agent, or Firm*—Foley & Lardner LLP

(57) ABSTRACT

There is disclosed a system equipped with information processors of control and standby systems interconnected to communicate with each other. The information processor of the control system executes a POST operation and a starting operation (S101 to S103), and instructs execution of a POST operation to the information processor of the standby system after completion of the starting operation (S104). Meanwhile, the information processor of the standby system monitors an operation of the control system (S106), executes the POST operation upon reception of the instruction from the control system (S107), and requests synchronization with its own device to the information processor of the control system upon completion of the POST operation (S108). The information processor of the control system copies information regarding the starting operation executed by its own device upon reception of the synchronization request, thereby starting a synchronous operation with the device (S109 to S110). Thus, the system that uses a dual platform technology is easily started.

9 Claims, 6 Drawing Sheets

STARTING CONTROL METHOD, DUPLEX PLATFORM SYSTEM, AND INFORMATION PROCESSOR

BACKGROUND OF THE INVENTION

1. Field of the Invention

The present invention relates to a duplex platform system equipped with an information processor which becomes a control system started at the time of running the system and an information processor which becomes a standby system set on standby for starting, and more particularly to a starting control method and an information processor of the system.

2. Description of the Related Art

Conventionally, to prevent a stop of a system caused by a fault of an information processor incorporated in the system, there has been known a duplex platform technology which incorporates a pair of information processors in the system, starts one of them as a control system, and sets the other processor on standby as a standby system to be used instead when the control system fails. The system that uses this technology generally has a configuration shown in FIG. 6. A system 4 (shown) includes devices 1 and 2 which are information processors interconnected to communicate with each other, and a power supply control section 3 which supplies power to these devices.

FIG. 7 shows an operation procedure in the system 4 at the time of starting. In the shown procedure, the device 1 is set as a control system while the device 2 is set as a standby system as an example. When power is supplied from the power supply control section 3 to start running of the system 4, the devices 1 and 2 perform power-on-self-test (POST) operations in synchronization to self-diagnose faults of hardware, thereby determining a success of starting. The devices 1 and 2 wait for completion of each other's POST operation, and execute OS starting operations in synchronization upon completion of both POST operations. Additionally, after waiting for completion of the OS starting operations, the devices 1 and 2 start drivers of peripheral devices in synchronization. Upon an end of the waiting for driver starting, the process proceeds to application operations carried out in synchronization by the devices 1 and 2.

During the execution of the above processing, the devices 1 and 2 use watchdog timers (WDT) for monitoring CPU operations in accordance with periodic updating instructions from CPU's to monitor whether the POST operations, the starting operations and the driver starting are executed normally or not.

An example of a conventional technology that uses the duplex platform technology is described in Patent Document 1 below. According to the technology described in the Patent Document 1, in two synchronously run CPU's of a duplex computer system, a monitoring time of a watchdog timer of a standby side is set longer than that of a control side so that a similar stop of the standby side can be prevented after the control side stops due to a timeout.

Patent Document 1: JP-A-11-175108

However, the conventional system has a problem that it is difficult to shorten a time from the supplying of power to the transfer to the application operations because of the synchronous executions of the operations such as POST operations or OS starting operations between the control system and the standby system. In the case of implementing the conventional system, as each operation needs a waiting step, a general program for causing the CPU to continuously execute a series of starting operations cannot be directly used as a program for starting. In consequence, to introduce the duplex platform technology, work such as changing of the general program or creation of an independent program is necessary regarding starting.

SUMMARY OF THE INVENTION

The present invention has been developed with the foregoing problems in mind, and it is an object of the invention to provide a method capable of easily starting a system which uses a duplex platform technology.

A starting control method according to the present invention is a starting control method of a pair of information processors which are interconnected to communicate with each other and set to different systems of a control system started at the time of running and a standby system set on standby for starting at the time of running, comprising causing each of the information processors to set a system of its own device based on system history of past running times when power is supplied to the pair of information processors; causing the information processor of the control system to execute a POST operation and a starting operation for determining a success of starting of its own device, and to instruct execution of a POST operation to the information processor of the standby system after completion of the starting operation; causing the information processor of the standby system to execute the POST operation in accordance with the instruction, and to request synchronization with its own device to the information processor of the control system upon completion of the POST operation; and causing the information processor of the control system to copy information regarding the starting operation executed by its own device upon reception of the synchronization request, thereby starting a synchronous operation with the device.

A dual platform system according to the present invention comprises a pair of information processors which are interconnected to communicate with each other and set to different systems of a control system started at the time of running and a standby system set on standby for starting at the time of running, wherein each of the information processors includes a monitoring section to set a system of its own device based on system history of past running times when power is supplied and to monitor operations of its own device and the other device based on the set system, and a control section to execute an operation corresponding to the system set by the monitoring section; the control section executes a POST operation and a starting operation for determining a success of starting of its own device when its own device is set to the control system, and instructs execution of a POST operation to the other device of the standby system after completion of the starting operation; the control section executes the POST operation in accordance with an instruction from the other device of the control system when its own device is set to the standby system, and requests synchronization with its own device to the other device of the control system upon completion of the POST operation; and the monitoring section copies information regarding the starting operation executed by its own device upon reception of the synchronization request from the other device of the standby system when its own device is set to the control system, thereby starting a synchronous operation with the device.

An information processor according to the present invention is an information processor set to one of a control system started at the time of running and a standby system set on standby for starting at the time of running and connected to communicate with the other information processor set to the other system, comprising a monitoring section which sets a system of its own device based on system history of past running times when power is supplied and monitors operations of its own device and the other device based on the set system; and a control section which executes an operation corresponding to the system set by the monitoring section, wherein the control section executes a POST operation and a starting operation for determining a success of starting of its own device when its own device is set to the control system, and instructs execution of a POST operation to the other device of the standby system after completion of the starting operation, the control section executes the POST operation in accordance with an instruction from the other device of the control system when its own device is set to the standby system, and requests synchronization with its own device to the other device of the control system upon completion of the POST operation, and the monitoring section copies information regarding the starting operation executed by its own device upon reception of the synchronization request from the other device of the standby system when its own device is set to the control system, thereby starting a synchronous operation with the device.

According to the present invention, as the information processor of the control system to which power has been supplied instructs a POST operation to the device of the standby system upon completion of the POST operation or the starting operation to implement synchronization, synchronous executions of a series of starting operations between the two devices are made unnecessary. As a result, it is possible to shorten a time necessary for starting by an amount equivalent to an unnecessary waiting step during starting, and to use a general program for continuously executing a series of starting operations.

DESCRIPTION OF THE PREFERRED EMBODIMENT

Figure 1:
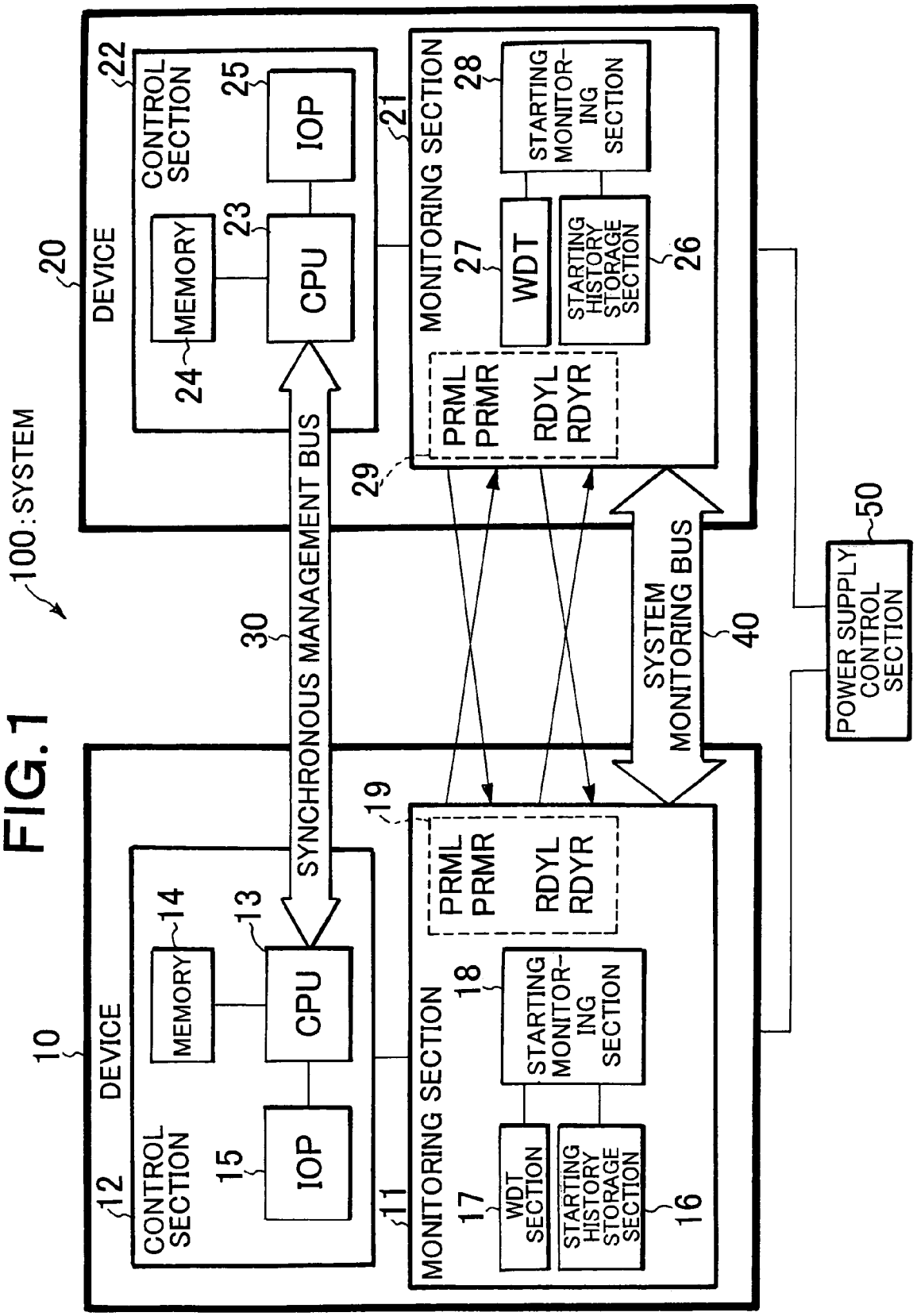
FIG. 1 is a block diagram showing a configuration of a duplex platform system according to an embodiment of the present invention.

Next, the preferred embodiment of the present invention will be described in detail with reference to the accompanying drawings. FIG. 1 is a block diagram showing a configuration of a dual platform system according to an embodiment of the present invention. A system 100 of the embodiment includes devices 10 and 20 which become a pair of information processors to implement a dual platform technology, a power supply control section 50 for supplying ON/OFF information of a power supply button and power to these devices 10 and 20, and a synchronous management bus 30 and a system monitoring bus 40 for interconnecting the devices 10 and 20. As in the case of the conventional system, one of the devices 10 and 20 is operated as a control system while the other is operated as a standby system at the time of running the system 100.

The devices 10 and 20 are identical in configuration. As shown in FIG. 1, the device 1 includes a monitoring section 11 for setting a system of its own device to monitor operations of its own device and the other device, and a control section 12 for executing processing corresponding to the system set by the monitoring section 11. The control section 12 is constituted of a CPU 13, a memory 14, and an input/output processor (IOP) 15. The CPU 13 uses the memory 14 and the IOP 15 to execute program processing corresponding to the control and standby systems described below.

The monitoring section 11 is a device for monitoring operations of the information processor, i.e., a baseboard management controller (BMC), and constituted of a starting history storage section 16 for storing starting history indicating systems of its own device at previous running times, a WDT section 17 which performs a conventionally known watchdog timer function to monitor an operation of the CPU 13, and a starting monitoring section 18 for determining a system of its own device based on the starting history and monitoring its own device and the other device by using a starting monitoring signal 19 described below.

The device 20 includes components corresponding to those of the device 10, i.e., a control section 22 constituted of a CPU 23, a memory 24 and an IOP 25, and a monitoring section 21 constituted of a starting history storage section 26, a WDT section 27, and a starting monitoring section 28.

The devices 10 and 20 synchronize the CPU's 13 and 23 with each other through the synchronous management bus 30, and transfer staring monitoring signals (19, 29) or the like between the monitoring sections 11 and 21 through the system monitoring bus 40.

For the starting monitoring signal 19, as signals for monitoring the systems, an own device stating form indicating signal (PRML) for indicating a system of its own device, and the other device starting form indicating signal (PRMR) for determining a system of the other device are provided. As signals for monitoring presence of operations, an own device starting state indicating signal (RDYL) for indicating an operation situation of its own device and the other device starting state indicating signal (RDYR) for determining an operation situation of the other device are provided.

Each of the PRML and the PRMR for monitoring the systems indicates that the device is a control system when its value is "1", and that the device is a standby system when its value is "0". Each of the RDYL and RDYR for monitoring the operation situations indicates that the device is being operated when its value is "1", and that the device is not being operated when its value is "0". For example, when the PRML and the RDYL of the device 10 side are both "1", it indicates that the device 10 is being operated as a control system. At this time, in the other device 20, the PRMR and the RDYR indicating states of the device 10 are similarly "1". Based on these values, the device 20 recognizes that the device 10 is being operated as the control system. Simultaneously, a message that the device 20 is a standby system of an unoperated state is given from the device 20 of the standby system to the device 10 of the control system in accordance with the aforementioned mechanism.

Figure 2:
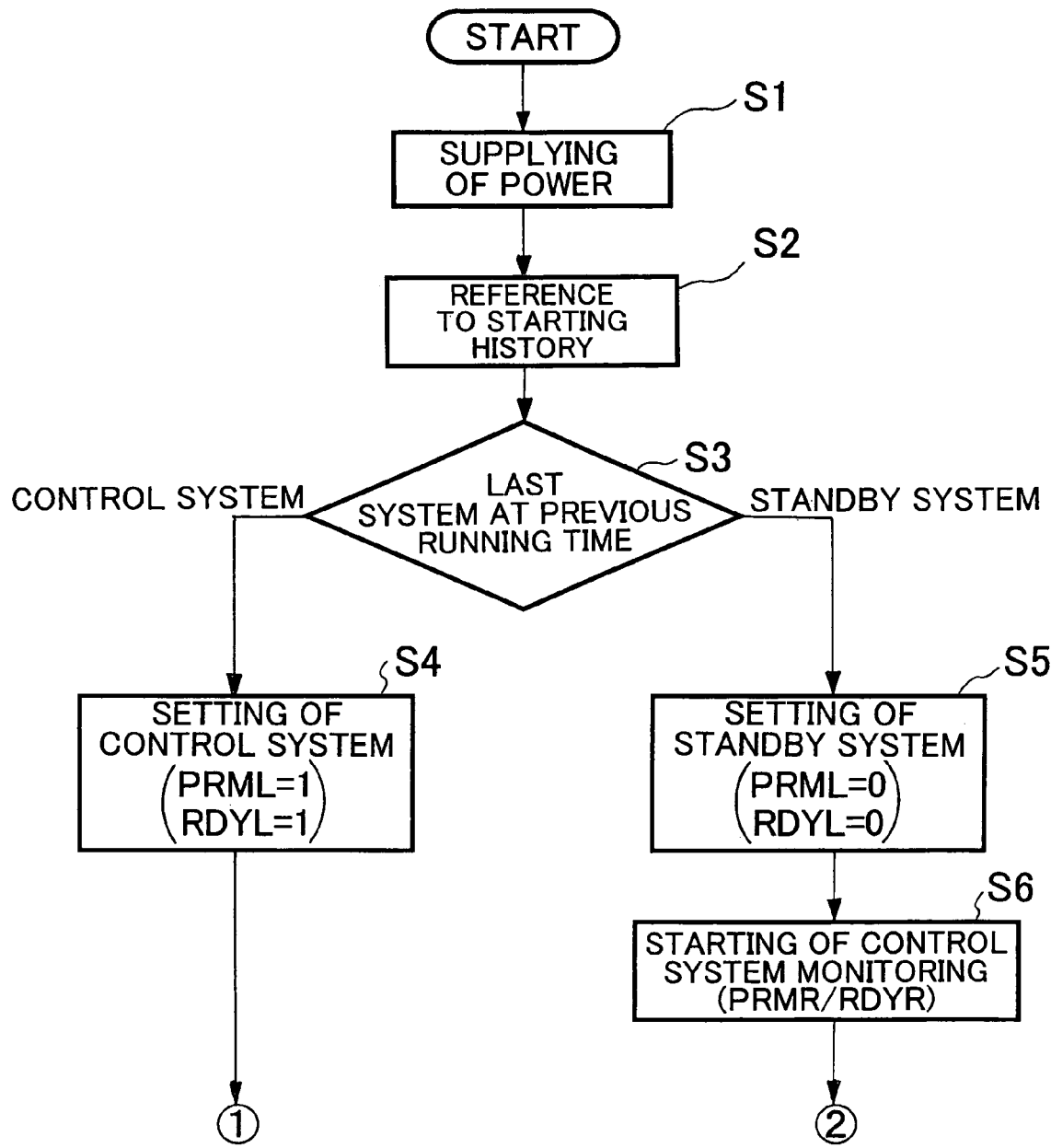
FIG. 2 is a flowchart showing a system setting procedure according to the embodiment.

Hereinafter, an operation procedure of the system 100 will be described. First, a procedure up to setting of systems of their own by the devices 10 and 20 will be described by referring to a flowchart of FIG. 2. In the system 100, when the power supply button is pressed to start its running, it is announced from the power supply control section 50 to the devices 10 and 20 (step S1).

The monitoring sections 11 and 21 of the devices 10 and 20 refer to starting history of the starting history storage sections (16, 26) (step S2) to determine systems of their own to be set this time based on systems set in the past. According to the embodiment, a last system of a previous running time is determined (step S3). If a result shows an end of the previous running time as a control system, "1" is set in the PRML and a PDTL of the starting monitoring signals (19, 29) to start running as a control system again this time (step S4). Hence, it is indicated that an own device is operated as a control system at a present time.

If a result shows an end of the previous running time as a standby system, "0" is set in the PRML and the PDTL of the starting monitoring signals (19, 29) to indicate that an own device is an unoperated standby system (step S5). Then, monitoring of a situation of the other device of the control system is started by using the PRMR and an RDTR of the starting monitoring signals (19, 29) (step S6). Through this procedure, the systems are set in the devices 10 and 20.

The system setting can be simplified by employing a method of applying a last system of a previous running time as in the case of the embodiment. However, this method is not the only way. For example, another method based on starting history may be employed, which determines a system of a longer setting period at a past running time to set it as a current system.

Figure 3:
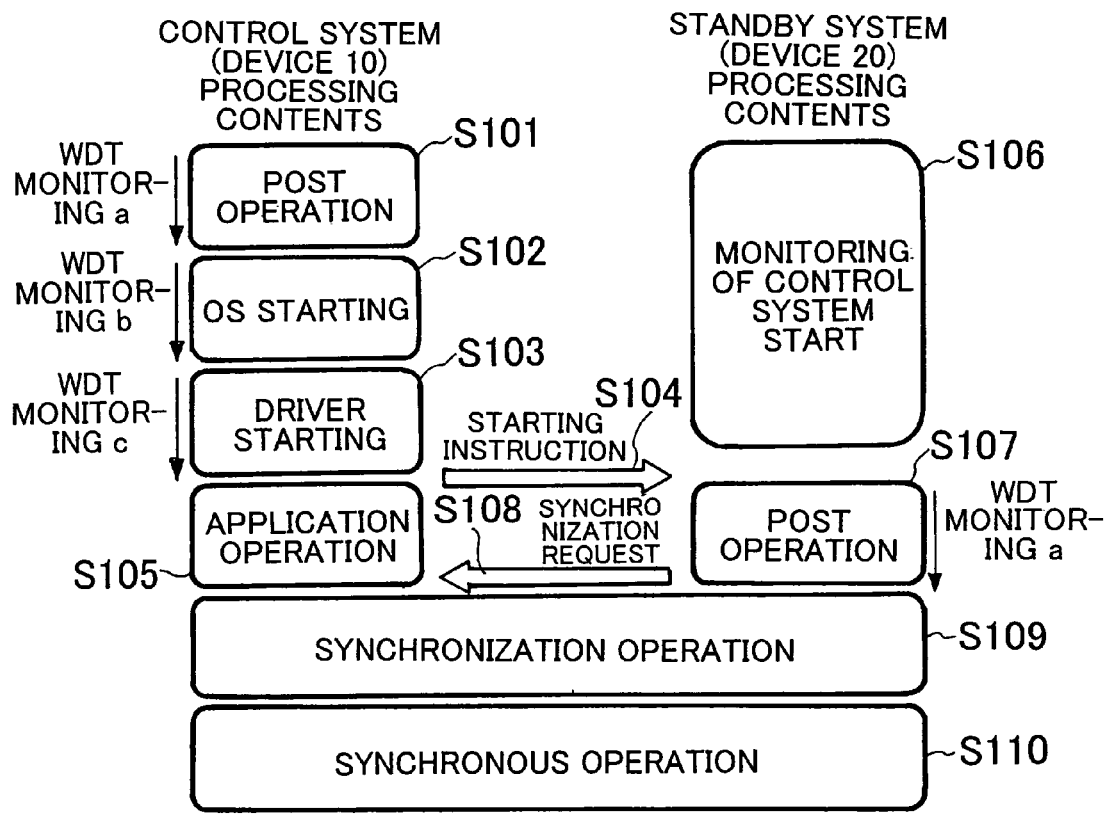
FIG. 3 is an explanatory diagram of a basic operation according to the embodiment.

FIG. 3 schematically shows basic operations of the control and standby systems in the system 100. As an example, the device 10 will be set as a control system, and the other device 20 will be set as a standby system. The basic operation of each system will be described in accordance with the procedure (shown). First, the monitoring section 11 of the control device 10 of the control system instructs the CPU 13 to start a program, and monitors the operation of the CPU 13 through the WDT section 17. That is, it is determined that the CPU 13 is normally operated while the WDT section 17 is periodically updated by the CPU 13. When a timeout is reached without updating the WDT section 17 at a predetermined time, it is determined that the operation of the CPU 13 is abnormal.

Upon reception of the program starting instruction from the monitoring section 11, the CPU 13 sequentially executes a series of starting operations including a POST operation for diagnosing permission of starting (step S101), an OS starting operation (step S102), and a starting operation of each driver of a peripheral device (step S103). During this period, the CPU 13 updates the WDT 17, and the monitoring section 11 monitors a timeout of the WDT section 17 (WDT monitoring a to c). As long as no timeout occurs, the CPU 13 continuously executes the POST operation, the OS starting operation, and the driver starting operation.

Upon completion of the starting of the driver, the monitoring section 11 announces a starting instruction to the device 20 through the system monitoring system 40 to incorporate the device 20 of the standby system, i.e. to synchronize with the device 20 (step S104). At this time, the CPU 13 starts its operation by an application program (step S105).

While the device 10 executes the aforementioned procedure as the control system, in the device 20 of the standby system, the monitoring section 21 refers to the PRMR and the RDRT of the starting monitoring signal 29 to monitor a state of the device 10 (step S106). The monitoring section 21 that has received the starting instruction from the device 10 instructs the CPU 23 of its own device to start a program, and an operation of the CPU 23 is monitored by the WDT section 27. The CPU 23 that has received the instruction to start the program executes a POST operation (step S107). When the POST operation is completed, the monitoring section 21 announces a synchronization request to the device 10 of the control system (step S108).

Upon reception of the request from the device 20, the device 10 interrupts the execution of the application program to perform a synchronization operation, and copies information indicating the operation situation of the CPU 13 up to a present time, i.e., information set after the POST operation of the step S101. Accordingly, the device 20 of the standby system is set in an operation environment after starting completion as in the case of the device 10 of the control system. Then, the device 10 of the control system simultaneously resumes the program processing of its own device and the program processing of the standby system (step S109). Thereafter, the system 100 is run by synchronous operations between the devices (step S110).

According to the aforementioned procedure, the device of the control system to which the power has been supplied starts the device of the standby system to execute synchronization, making it unnecessary to synchronize the devices with each other when the series of starting operations are carried out. As a result, a waiting step during stating is made unnecessary to enable shortening of a time for starting. Moreover, it is possible to use a general program for continuously executing a series of starting operations.

Figure 4:
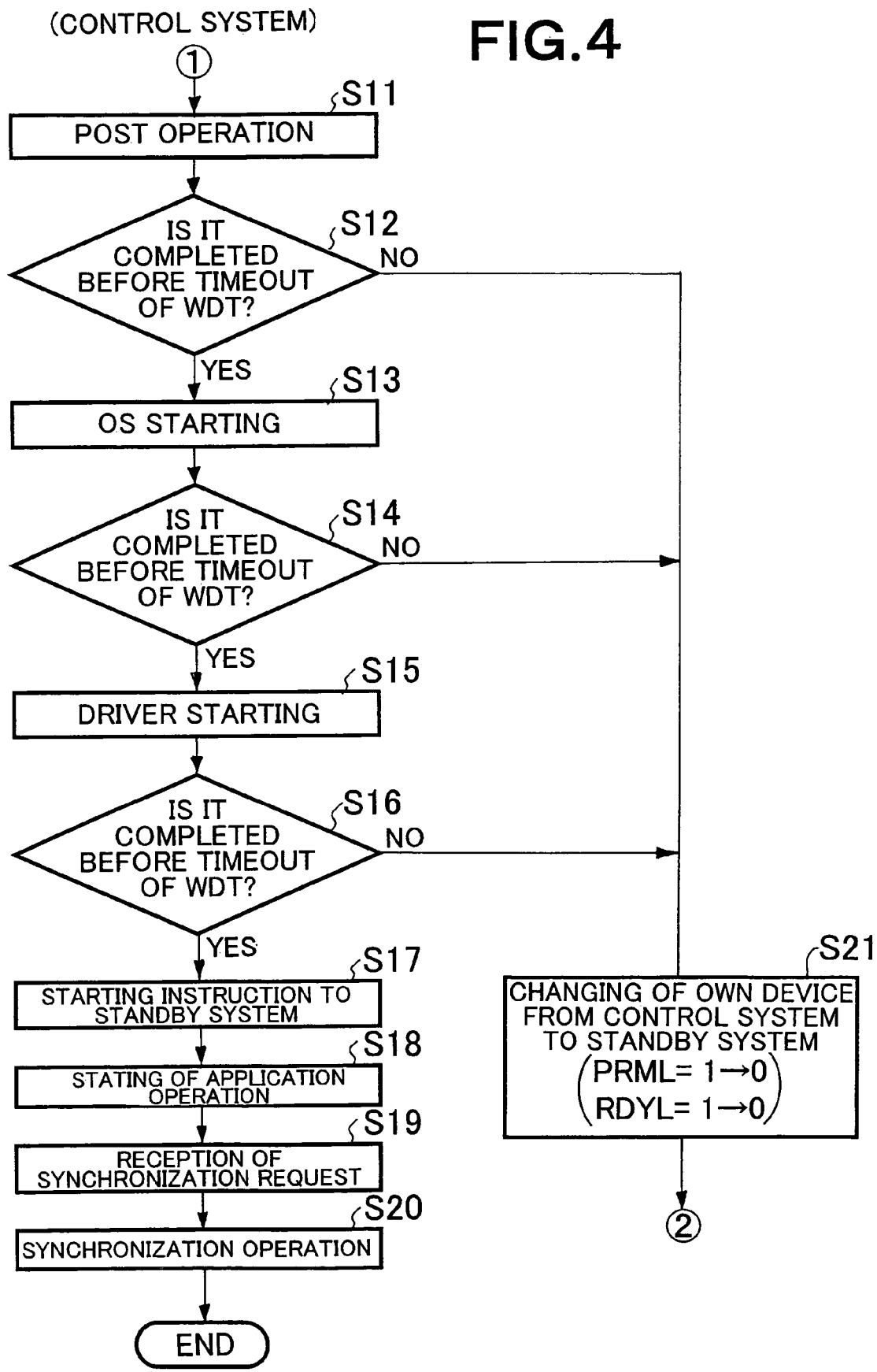
FIG. 4 is a flowchart showing an operation of a control system according to the embodiment.

Next, an operation procedure that takes an operation abnormality of the CPU into consideration in the system 100 will be described. FIG. 4 is a flowchart showing an operation procedure of the control system. Hereinafter, the procedure of FIG. 4 will be described on the assumption that the control system is set in the device 10 in the step S4 of FIG. 2.

The device 10 of the control system executes a POST operation (step S11). When the POST operation is completed before a timeout of the WDT section 17 (step S12; Yes), a normal end of the POST operation by the CPU 13, i.e., permission of starting, is determined to execute an OS starting operation (step S13). Subsequently, when the OS starting operation is completed before a timeout (step S14: Yes), normal starting of the OS is determined to start the driver (step S15). Upon normal starting of the driver (step S16: Yes), a starting instruction is announced to the device 20 of the standby system (step S17). Thereafter, a procedure of starting an operation by an application program (step S18) and executing a synchronizing operation to meet a request from the standby system (steps S19, S20) is similar to that described above with reference to FIG. 3, and thus detailed description thereof will be omitted.

On the other hand, when an operation abnormality of the CPU 13 occurs in one of the POST operation, the OS starting operation, and the driver starting operation, and the WDT section 17 is not updated periodically as prescribed, the monitoring section 11 detects a timeout of the WDT section 17 (steps S12, S14, S16: No). The monitoring section 11 that has detected the timeout changes values of the RPML and the RDYL of the starting monitoring signal 10 from "1" to "0", thereby changing its own device to an unoperated standby system (step S21).

Figure 5:
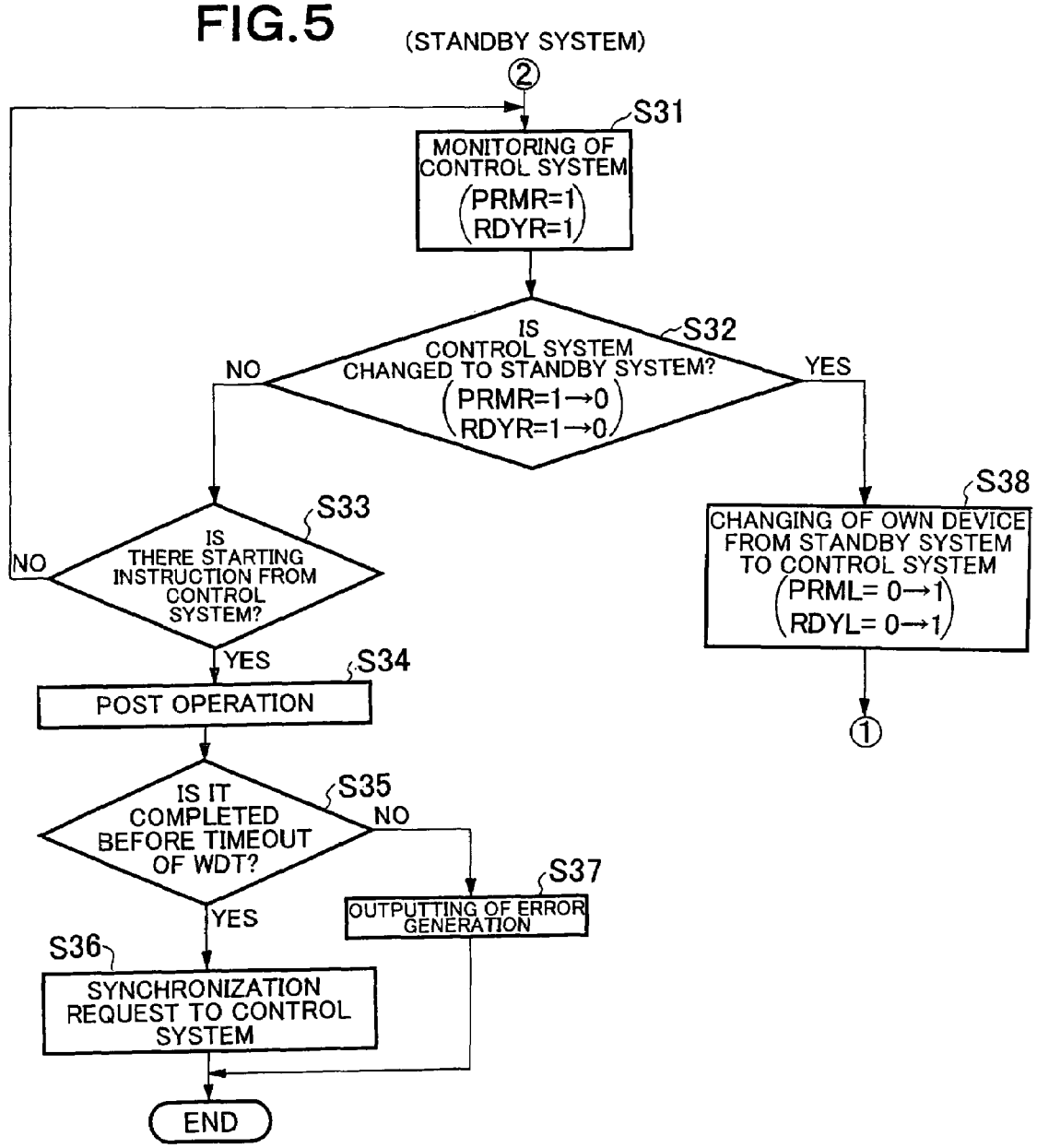
FIG. 5 is a flowchart showing an operation of a standby system according to the embodiment.
Figure 6:
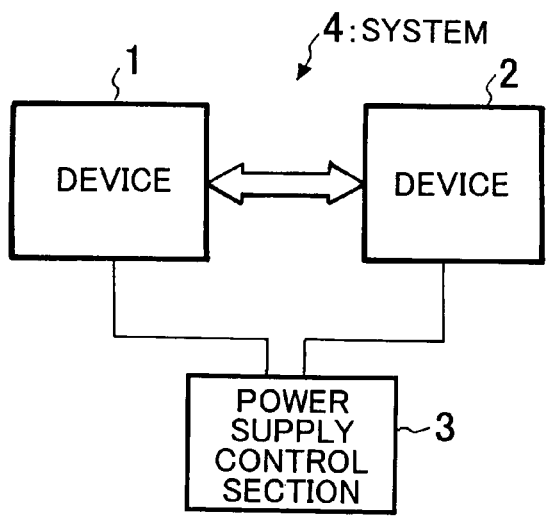
FIG. 6 is a block diagram showing a configuration of a conventional system.
Figure 7:
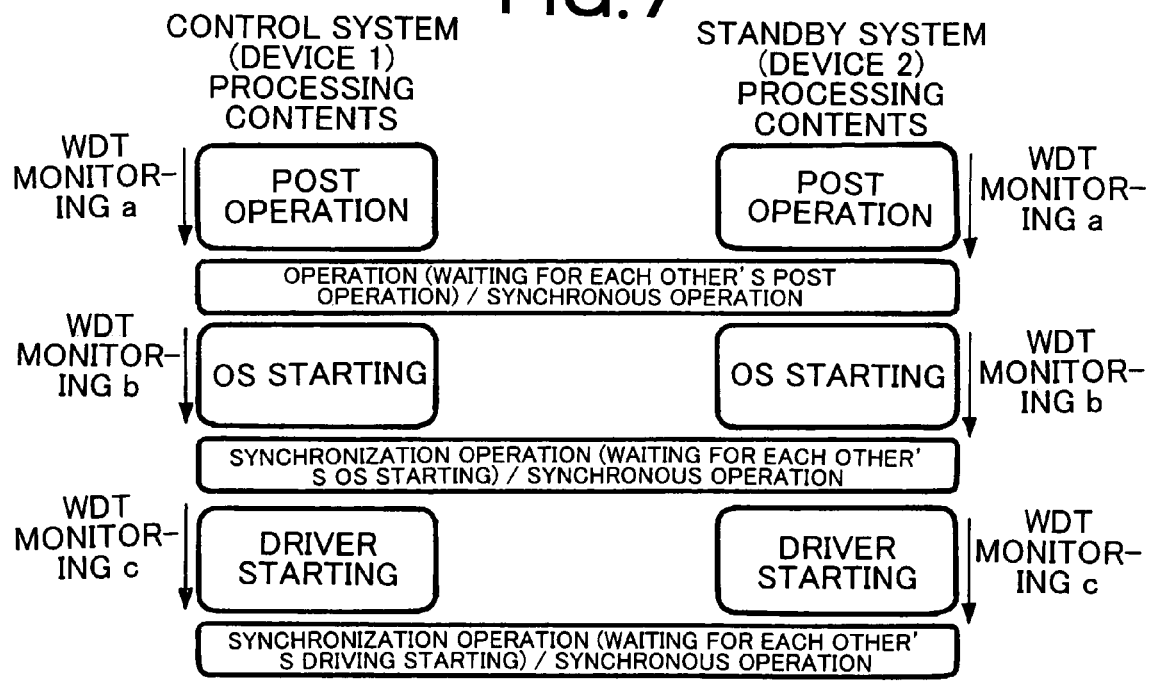
FIG. 7 is an explanatory diagram of a basic operation of the conventional system.

FIG. 5 shows an operation procedure of the standby system. The procedure (shown) corresponds to the procedure executed after the change of the device 10 to the standby system in the step S21 (FIG. 4). In this case, however, description will be made by assuming that the other device 20 first sets the standby system in the step S5 of FIG. 2, and this device 20 executes the procedure of FIG. 5.

In the device 20 of the standby system, the monitoring section 21 refers to the PRMR and the RDYR of the starting monitoring signal to monitor a situation of the device 10 of the control system (step S31). While the device 10 is a control system, "1" is set in each of the RPMR and RDYR of the starting monitoring signal 29. While the PRMR and the RDYR are "1" (step S32: No), the monitoring section 21 monitors presence of a starting instruction (FIG. 4: step S17) from the device 10 of the control system (step S33).

Upon reception of the starting instruction from the device 10, the monitoring section 21 executes a POST operation (step S34). If it is completed before a timeout of the WDT section 27 (step S35: Yes), a synchronization operation is requested to the device 10 of the control system (step S36). If the POST operation is not completed, and a timeout of the WDT section 27 is detected (step S25: No), a message that the device 20 cannot be normally operated as the standby system because of an abnormality is output (step S37).

While monitoring the state of the control system (step S31), upon detection of changes of the RPMR and the RDYR of the starting monitoring signal 29 from "1" to "0", the monitoring section 21 recognizes a change of the device 10 from the control system to the standby system (step S32: Yes). At this time, the monitoring section 21 changes values of the RPML and the RDYL indicating a situation of its own device from "0" to "1", thereby indicating a change of the device 20 from the unoperated standby system to the control system which is being operated (step S38). Thereafter, the device 20 is operated in accordance with the procedure of the control system described above with reference to the flowchart of FIG. 4.

When the device is changed from the control system to the standby system, even if its cause is an abnormality of the POST operation, the POST operation is tried again after the change to the standby system (FIG. 5: step S34). However, if the problem of the previous POST operation has been solved by this time, the POST operation is completed without any timeout (step S35: Yes). An example in which retrial of a POST operation after a change is successful is a case in which an illegal operation to be solved with a passage of time occurs, such as an illegal operation by an influence of external noise or an increase of an environmental temperature, or an illegal operation by an influence of residual charges caused by a short switching interval from power OFF to ON.

According to the aforementioned procedure, when a CPU abnormality occurs while the device of the control system executes a series of starting operations, the other device of the standby system is changed to the control system to start a series of starting operations. Thus, the series of starting operations can be continued by one of the devices without interrupting system starting. As a result, it is possible to quickly start the system.

What is claimed is:

1. A starting control method of a pair of information processors which are interconnected to communicate with each other and set to different systems of a control system started at the time of running and a standby system set on standby for starting at the time of running, comprising:
   causing each of the information processors to set a system of its own device based on system history of past running times when power is supplied to the pair of information processors;
   causing the information processor of the control system to execute a POST operation and a starting operation for determining a success of starting of its own device, and to instruct execution of a POST operation to the information processor of the standby system after completion of the starting operation;
   causing the information processor of the standby system to execute the POST operation in accordance with the instruction, and to request synchronization with its own device to the information processor of the control system upon completion of the POST operation; and
   causing the information processor of the control system to copy information regarding the starting operation executed by its own device upon reception of the synchronization request, thereby starting a synchronous operation with the device.

2. The method according to claim 1, wherein:
   the information processor of the standby system monitors setting of a system in the information processor of the control system,
   the information processor of the control system monitors each of the POST operation and the starting operation of its own device by a watchdog timer, and changes setting of a system of its own device from the control system to the standby system upon detection of a timeout in the monitoring, and
   the information processor of the standby system changes setting of a system of its own device from the standby system to the control system upon detection of the system change in the information processor of the control system.

3. The method according to claim 1, wherein when setting the system of its own device, each of the information processors determines a last system of its own device at a previous running time, and sets a system identical to the determined system.

4. A dual platform system comprising:
   a pair of information processors which are interconnected to communicate with each other and set to different systems of a control system started at the time of running and a standby system set on standby for starting at the time of running, wherein:
   each of the information processors includes a monitoring section to set a system of its own device based on system history of past running times when power is supplied and to monitor operations of its own device and the other device based on the set system, and a control section to execute an operation corresponding to the system set by the monitoring section,
   the control section executes a POST operation and a starting operation for determining a success of starting of its own device when its own device is set to the control system, and instructs execution of a POST operation to the other device of the standby system after completion of the starting operation,
   the control section executes the POST operation in accordance with an instruction from the other device of the control system when its own device is set to the standby system, and requests synchronization with its own device to the other device of the control system upon completion of the POST operation, and
   the monitoring section copies information regarding the starting operation executed by its own device upon reception of the synchronization request from the other device of the standby system when its own device is set to the control system, thereby starting a synchronous operation with the device.

5. The dual platform system according to claim 4, wherein:
   the monitoring section monitors each of the POST operation and the starting operation of its own device by a watchdog timer when its own device is set to the control system, and changes setting of a system of its own device from the control system to the standby system upon detection of a timeout in the monitoring, and monitors setting of a system in the other device of the control system when its own device is set to the standby system, and changes setting of a system of its own device from the standby system to the control system upon detection of the system change in the other device of the control system.

6. The dual platform system according to claim 4, wherein when setting the system of its own device, the monitoring section determines a last system of its own device at a previous running time, and sets a system identical to the determined system.

7. An information processor set to one of a control system started at the time of running and a standby system set on standby for starting at the time of running and connected to communicate with the other information processor set to the other system, comprising:

a monitoring section which sets a system of its own device based on system history of past running times when power is supplied and monitors operations of its own device and the other device based on the set system; and a control section which executes an operation corresponding to the system set by the monitoring section, wherein:

the control section executes a POST operation and a starting operation for determining a success of starting of its own device when its own device is set to the control system, and instructs execution of a POST operation to the other device of the standby system after completion of the starting operation, the control section executes the POST operation in accordance with an instruction from the other device of the control system when its own device is set to the standby system, and requests synchronization with its own device to the other device of the control system upon completion of the POST operation, and the monitoring section copies information regarding the starting operation executed by its own device upon reception of the synchronization request from the other device of the standby system when its own device is set to the control system, thereby starting a synchronous operation with the device.

8. The information processor according to claim 7, wherein:

the monitoring section monitors each of the POST operation and the starting operation of its own device by a watchdog timer when its own device is set to the control system, and changes setting of a system of its own device from the control system to the standby system upon detection of a timeout in the monitoring, and monitors setting of a system in the other device of the control system when its own device is set to the standby system, and changes setting of a system of its own device from the standby system to the control system upon detection of the system change in the other device of the control system.

9. The information processor according to claim 7, wherein when setting the system of its own device, the monitoring section determines a last system of its own device at a previous running time, and sets a system identical to the determined system.

* * * * *